(12) United States Patent
Greubel (10) Patent No.: US 6,561,053 B2
(45) Date of Patent: May 13, 2003

(54) ROLLING-BODY SCREW DRIVE

(75) Inventor: Roland Greubel, Ramsthal (DE)

(73) Assignee: Rexroth Satr GmbH, Schweinfurt (DE)

( * ) Notice: Subject to any disclaimer, the term of this patent is extended or adjusted under 35 U.S.C. 154(b) by 42 days.

(21) Appl. No.: 09/801,372

(22) Filed: Mar. 7, 2001

(65) Prior Publication Data

US 2001/0025540 A1 Oct. 4, 2001

(30) Foreign Application Priority Data

Mar. 9, 2000 (DE) .......................... 100 11 383

(51) Int. Cl.$^7$ ................................. F16H 1/24
(52) U.S. Cl. ................... 74/424.87; 74/424.82
(58) Field of Search ............... 74/424.87, 424.81, 74/424.82, 424.86, 89.36, 89.37, 89.38, 441, 459.5; 384/43, 44, 49, 504, 510

(56) References Cited

U.S. PATENT DOCUMENTS

| 3,971,264 A | | 7/1976 | Detraz et al. ............. 74/459 |
|---|---|---|---|
| 4,258,584 A | | 3/1981 | Haegele et al. ........ 74/424.8 R |
| 4,357,838 A | | 11/1982 | Blaurock et al. ......... 74/424.8 |
| 4,604,911 A | | 8/1986 | Teramachi ........... 74/424.8 R |
| 5,005,436 A | | 4/1991 | Brusasco ................ 74/459 |
| 5,094,119 A | | 3/1992 | Virga et al. .............. 74/459 |
| 5,161,896 A | | 11/1992 | Höfling et al. ............. 384/8 |
| 5,299,465 A | | 4/1994 | Kasuga ................ 74/424.8 |
| 5,373,755 A | * | 12/1994 | Rohlinger ............. 74/424.86 |
| 5,492,036 A | | 2/1996 | Sato .................... 74/459 |
| 5,664,459 A | | 9/1997 | Muhleck et al. ...... 74/424.8 R |
| 5,791,192 A | * | 8/1998 | Lee ................... 74/424.87 |
| 5,800,064 A | | 9/1998 | Ohya ................... 384/44 |
| 6,425,302 B2 | * | 7/2002 | Greubel ............... 74/424.82 |

FOREIGN PATENT DOCUMENTS

| DE | 1425787 | 4/1969 |
|---|---|---|
| DE | 2423299 | 12/1974 |
| DE | 2437497 | 11/1975 |
| DE | 2914756 | 10/1980 |
| DE | 3425285 | 1/1986 |
| DE | 4340624 | 7/1994 |
| EP | 0472167 | 2/1992 |

OTHER PUBLICATIONS

German language brochure "AM–Werknorm 26" (AM Works Standard 26).
English language abstract for DE 1 425 787.
English language abstract for DE 29 14 756.
English language abstract for DE 24 37 497.
English language abstract for DE 34 25 285.
English language abstract for EP 0 472 167.

* cited by examiner

*Primary Examiner*—Pam Rodriguez (57) ABSTRACT

A rolling-body screw drive (10) comprises a threaded spindle and a threaded nut (12) enclosing the threaded spindle. A helically running threaded channel (16) is provided between an outer circumferential surface of the threaded spindle and an inner circumferential surface (12a) of the threaded nut (12). The threaded channel (16) forms, together with a return channel (22) in the nut (12) which connects the two end regions (16a, 16b) of the threaded channel (16), an endless circulatory channel (24) in which an endless series of rolling bodies is accommodated. Each of the two end regions (16a, 16b) of the threaded channel (16) is assigned a deflecting element (18) which is retained on the threaded nut (12) and has a deflecting channel (20) for transferring the rolling bodies between the threaded channel (16) and the return channel (22). At least one of the deflecting elements (18) is made up of at least two deflecting-element parts (26, 28) which together bound the deflecting channel (20).

19 Claims, 4 Drawing Sheets

ROLLING-BODY SCREW DRIVE

BACKGROUND OF THE INVENTION

The present invention relates to a rolling-body screw drive having a threaded spindle and a threaded nut enclosing the threaded spindle, a helically running threaded channel provided between an outer circumferential surface of the threaded spindle and an inner circumferential surface of the threaded nut, the threaded channel forming, together with a return channel which connects the two end regions of the threaded channel, an endless circulatory channel in which an endless series of rolling bodies is accommodated, and in which each of the two end regions of the threaded channel is assigned a deflecting element, which is retained on the threaded nut and has a deflecting channel, for transferring the rolling bodies between the threaded channel and the return channel and between the return channel and the threaded channel.

Such a rolling-body screw drive is known, for example, from DE 29 14 756 C2. It can easily be recognized that the task of producing those deflecting elements of the rolling-body screw drive which have a closed deflecting channel involves a relatively high cost outlay since the injection mold, for forming the deflecting channel, has to have at least two core elements inserted into the mold cavity from different sides. It is necessary for these core elements, once the deflecting element has cured, to be removed from the deflecting element and, in order to produce the next deflecting element, to be reintroduced into the mold and repositioned there. Furthermore, the deflecting elements of the known rolling-body screw drive, in particular in the case of heavy-load embodiments with large rolling-body diameters, were occasionally found to be insufficiently robust. This resulted in practice, in particular in the embodiments with an open deflecting channel, in undesired deformations of the deflecting elements on account of vastly differing wall thicknesses.

Deflecting elements as have been described above are also known from DE 24 37 4,7 C2. Reference is made in that regard to a brochure from A. Mannesmann, Remscheid entitled "AM-Werknorm 26" (AM Works Standard 26), which discloses the production of a deflecting element with a deflecting channel that is not fully closed in the circumferential direction. The deflecting channel is formed by means of an end mill which has cutting edges provided in spherical form on the tip.

SUMMARY OF THE INVENTION

In contrast to the foregoing, the object of the present invention is to provide a rolling-body screw drive of the type mentioned in the introduction with deflecting elements which are easier to produce.

This object is achieved according to the invention by a rolling-body screw drive of the aforementioned type in which at least one of the deflecting elements is made up of at least two deflecting-element parts which together form the deflecting channel. In the preferred production of the deflecting-element parts as plastic parts using injection molding, there is thus no need for any cores to be inserted into the mold in order to form the deflecting channel. It is thus possible for a completely cured deflecting-element part to be demolded simply by virtue of the mold halves being opened and for the mold to be prepared for the production of the next deflecting-element part simply by virtue of being reclosed. Cutting-type follow-up machining of the deflecting-element parts is not necessary. In particular, when a boundary surface of each of the deflecting-element parts, which boundary surface helps to bound the deflecting channel, extends from an inlet end of the deflecting channel to an outlet end of the deflecting channel, a deflecting element with a deflecting channel which is closed over its entire circumference can easily be produced.

The deflecting element may have, for example, a main deflecting-element part and at least one secondary, deflecting-element part. The main deflecting-element part, in addition to bounding the deflecting channel, may also perform other functions, for example, serving for fastening the deflecting element on the threaded nut. The deflecting-element parts may be clamped to one another, for example, or connected to one another by means of at least one pin which is arranged on one of the deflecting-element parts and engages in a corresponding recess in the respectively other deflecting-element part. If a plurality of such pin/recess pairs are provided, not all of the pins have to be arranged on one and the same deflecting-element part. At least one pin/recess pair may be designed such that the pin is introduced into the recess under pressure, with the result that a press fit is produced. Within the context of the present application, this type of connection may also be regarded as "clamping" of the deflecting-element parts. In principle, however, it is also conceivable for the deflecting-element parts to be adhesively bonded to one another.

A particularly reliable manner of fitting the deflecting element on the threaded nut to secure these two parts together by a screw-threaded fastener. It is possible here for a through-passage hole to be provided in the deflecting element for the through-passage of a screw-bolt fastener. Preferably, the through-passage hole is located only in the main deflecting-element part. In that case, as a result of the fastening, the at least one secondary deflecting-element part may be retained on the threaded nut by the main deflecting-element part.

In a particular aspect of the deflecting elements of the rolling-body screw drive according to the invention, the penultimate thread turn of the threaded surface bounding the threaded channel on the part of the threaded nut is formed, at least in part, by the outer surface of the deflecting element. In this way, the deflecting element can take up a relatively large amount of space in the threaded nut without adversely affecting the functioning of the latter. This means that the deflecting element may be of robust design, even when rolling bodies of large diameter are used.

If the course of that running-path flank of the penultimate thread turn which "cuts into" the deflecting element is selected such that said running-path flank is specifically relieved of loading as the rolling bodies move past, it is possible for wear to which the deflecting element is subjected by said rolling-body movement to be minimized, if not completely prevented. Such specific influencing of the course of running-path flanks is also referred to in specialist circles as "shifting".

In a further aspect of the invention, the deflecting element may also have a cutout or recess into which there is inserted a retaining element which is formed from a harder or softer material than the deflecting element. The retaining element is dimensioned in the direction of the depth of the cutout such that the retaining element accommodated in the cutout projects from the cutout to a greater extent than corresponds to the play or clearance provided between the deflecting element and the recess in the threaded nut which accommodates the deflecting element. It is possible, for example, for the retaining element to project from the cutout by between approximately 0.05 mm and approximately 0.4 mm, and preferably approximately 0.2 mm. In a particularly simple embodiment, the retaining element may be a ball. This ball may be produced from a material which may be either softer or harder than the material of the deflecting element. The ball may thus be produced, for example, from NBR (Nitrile-Butadiene Rubber) or from hardened steel. Use of a softer material, for example NBR, has the advantage that, when the deflecting element is forced into its accommodating recess, rather than the deflecting element being deformed, which could adversely affect the deflecting channel, it is the retaining ball that is deformed.

If the cutout is provided in a sub-surface of the outer surface of the deflecting element which is arranged essentially opposite that sub-surface of the outer surface of the deflecting element into which that end section of the deflecting channel which leads to the threaded channel opens out, it is possible for the deflecting element, as a result of the prestressing by the retaining element, to be forced against the threaded nut such that an essentially flush transition from the threaded channel to the deflecting channel is produced.

In order for it to be possible to facilitate the transfer of the rolling bodies from the threaded channel into the deflecting channel and vice versa, the deflecting element may also have a rolling-body lifting extension, which is intended for engaging in a thread turn of the threaded spindle. In this case, the outer contour of the lifting extension may be designed to correspond essentially to the contour of the threaded surface of the threaded spindle, and preferably such that, in the state in which the rolling-body screw drive is assembled and ready for operation, the outer contour of the lifting extension is arranged in an essentially equidistant manner to the contour of the base surface of the thread turn of the threaded spindle.

In a further aspect of the invention, it is also proposed that the return channel be formed by the interior of a return tube which is designed in one or more parts, has a tube wall preferably with no openings and is inserted into a return cutout or bore of the threaded nut, but preferably does not come into contact with the boundary walls of the return cutout. The use of such a return tube has the advantage that the production of the threaded nut is simplified since all that it requires is to have a return bore dimensioned with relatively large tolerances. A further advantage of using such a return tube is the associated reduction in the development of noise. In conjunction with a device which prestresses the deflecting element as aforementioned, i.e., by urging that end section of the deflecting channel which leads to the threaded channel in the direction of the threaded channel, the provision of a return tube has the additional advantage that any possible displacement of the deflecting element as a result of such prestressing cannot have an adverse effect, in the region of the other end section of the deflecting channel, on the transition between the return channel and the deflecting channel.

EP 0 472 167 31 and U.S. Pat. No. 5,800,064 disclose linear bearings in the case of which use is made of a return-tube arrangement and/or a slit return tube. Until now, however, the use of such return tubes has not been known in rolling-body screw drives.

In accordance with the invention, the return tube may be connected to the deflecting elements, for example, in that at least one of the longitudinal ends of the return tube engages in an annular recess formed on the deflecting element. Preferably, the return tube is clamped to the deflecting element.

It should also be added that the rolling bodies are preferably balls. In principle, however, other types of rolling bodies, for example rollers, should not be ruled out either.

BRIEF DESCRIPTION OF THE DRAWINGS

The invention is explained in more detail hereinbelow by way of exemplary embodiments and with reference to the attached drawings, in which.

DESCRIPTION OF EXEMPLARY EMBODIMENTS

Figure 4:
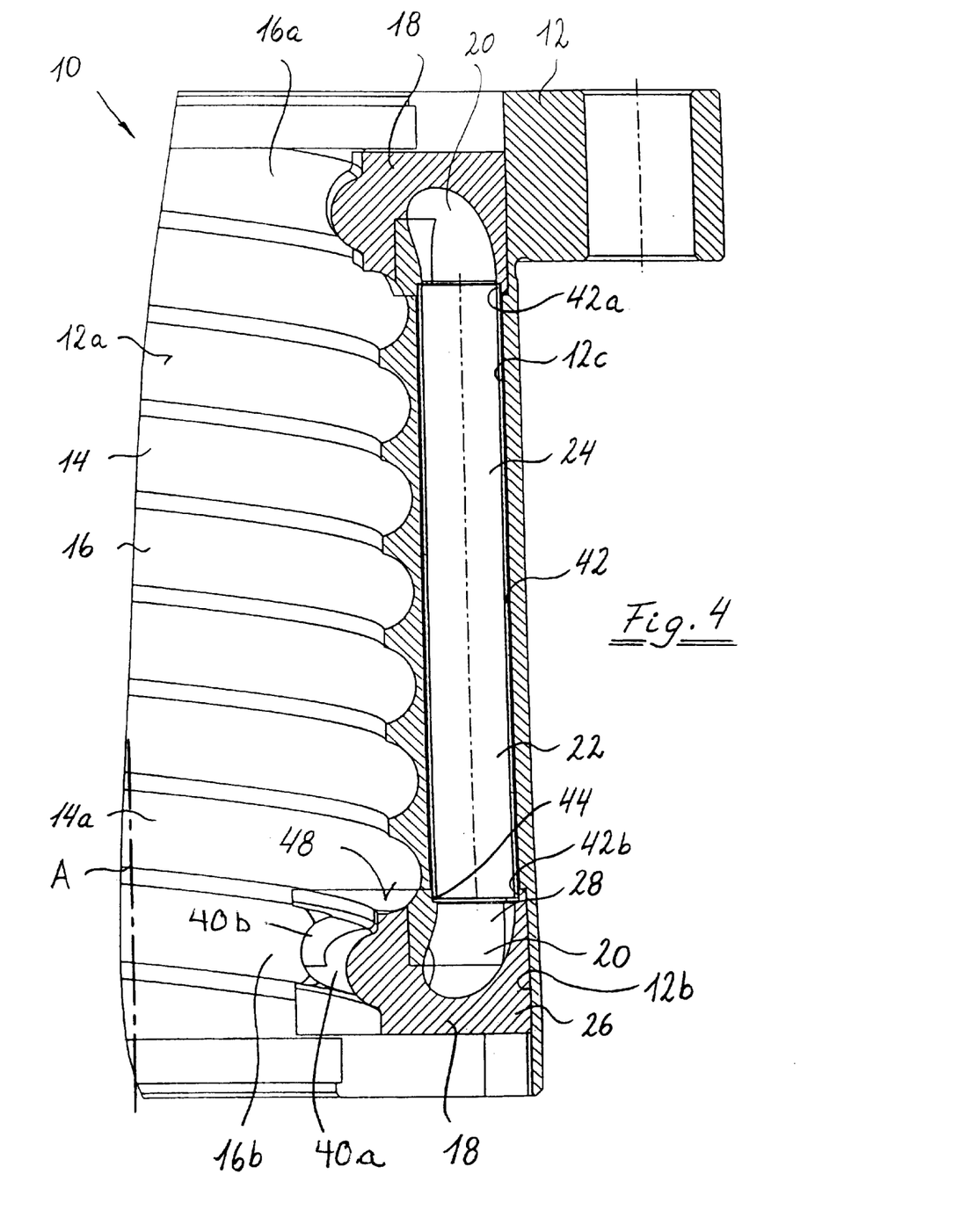
FIG. 4 illustrates a sectional view of part of the threaded nut of a rolling-body screw drive according to the invention and in which the deflecting element according to FIGS. 1–3 is used.

In FIG. 4, a rolling-body screw drive according to the invention is designated in general terms by 10. It comprises a threaded spindle (not illustrated) and a threaded nut 12 enclosing the threaded spindle. The threaded spindle is provided, on its outer circumferential surface, with a threaded surface running helically in the direction of the axis A. Analogously, the threaded nut 12 also has, on its inner circumferential surface 12a, a cooperating helically continuing threaded surface 14. The threaded surface of the threaded spindle and the threaded surface 14 of the threaded nut 12 together form a helically running threaded channel 16. At each end regions 16a and 16b of the threaded channel 16, a deflecting element 18 is provided on the threaded nut 12. Upon movement of the threaded nut 12 relative to the threaded spindle, one of the deflecting elements 18 serves for removing the rolling bodies (not shown), for example balls, which run in the threaded channel 16 from the threaded channel 16 and directing them, through a deflecting channel 20, to a return channel 22. From the return channel 22, the rolling bodies pass to the respectively other longitudinal end of the threaded channel 16, where they are guided back into the threaded channel 16 again by the respectively other deflecting element 18. The threaded channel 16, the two deflecting channels 20 of the deflecting element 18 and the return channel 22 together form an endless circulatory channel 24 in which an endless series of rolling bodies is accommodated.

Figure 1:
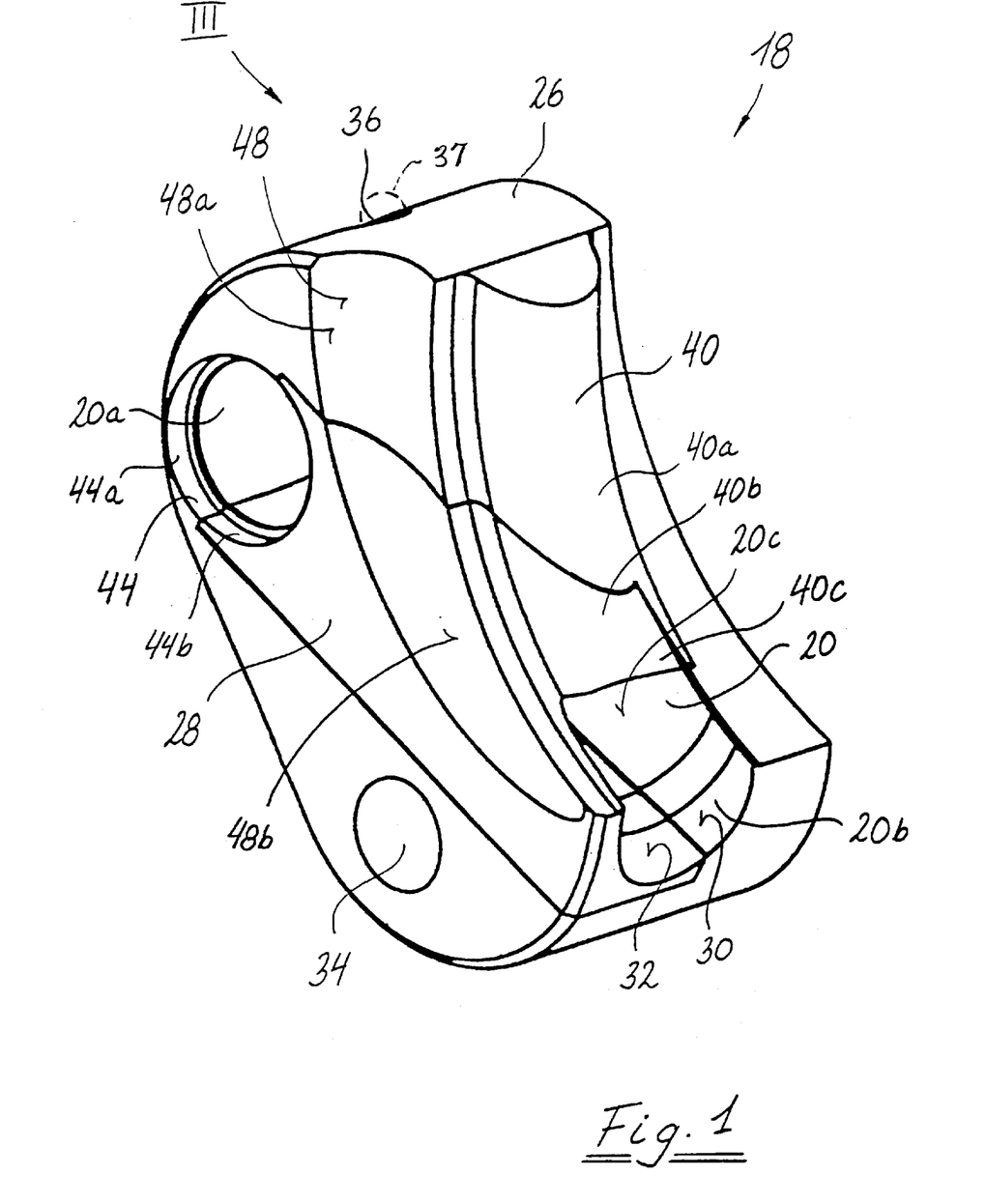
FIG. 1 illustrates an overall view, in perspective, of one embodiment of a deflecting element according to the invention.
Figure 2:
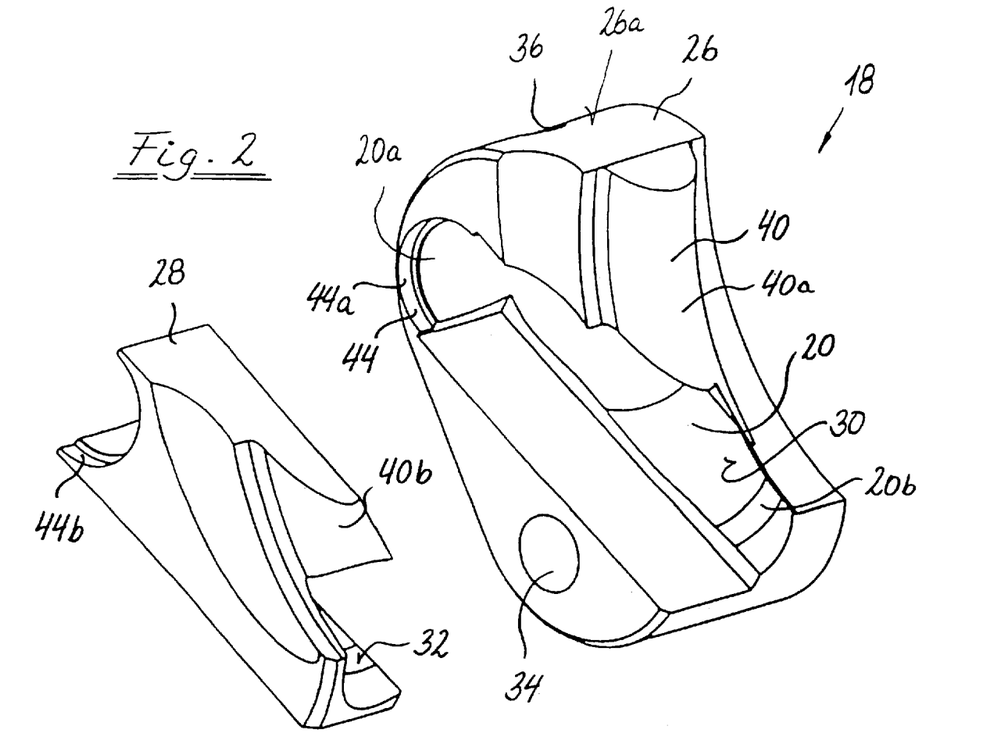
FIG. 2 illustrates a perspective view of the deflecting element according to FIG. 1, but in exploded form.

As is indicated in FIG. 4 and as can be seen more clearly from FIGS. 1 and 2, the deflecting elements 18 of the rolling-body screw drive 10 according to the invention are preferably designed in two parts. The deflecting element 18 thus comprises a main part 26 and a secondary part 28, which are preferably both produced from plastic as injection moldings. The two deflecting-element parts 26 and 28 together bound the deflecting channel 20 of the deflecting element 18. Specifically, the main part 26 comprises a deflecting-channel boundary sub-surface 30, which extends from a mouth opening 20a of the deflecting channel 20 in the vicinity of the return channel 22 to a mouth opening 20b of the deflecting channel 20 in the vicinity of the threaded channel 16. The secondary part 28 comprises a deflecting-channel boundary sub-surface 32, which extends between the two mouth openings 20a and 20b of the deflecting channel 20.

It is possible, in principle, for the two deflecting-element parts 26 and 28 to be fastened to one another by adhesive bonding. However, in order for it to be possible to prevent the deflecting channel from being adversely affected by adhesive passing out between the two deflecting-element parts 26 and 28 into the deflecting channel 20, it is advantageous if the two deflecting-element parts 26 and 28 are clamped to one another or are connected to one another by pins (not illustrated) which are arranged on one of the deflecting-element parts and engage in associated recesses (not illustrated) in the respectively other deflecting-element part. As can be seen, in particular, from FIG. 1, the two deflecting-element parts 26 and 28 adjoin one another in an essentially flush manner, with the result that an essentially smooth and step-free or protrusion-free boundary surface 20c of the deflecting channel 20 is produced.

Figure 3:
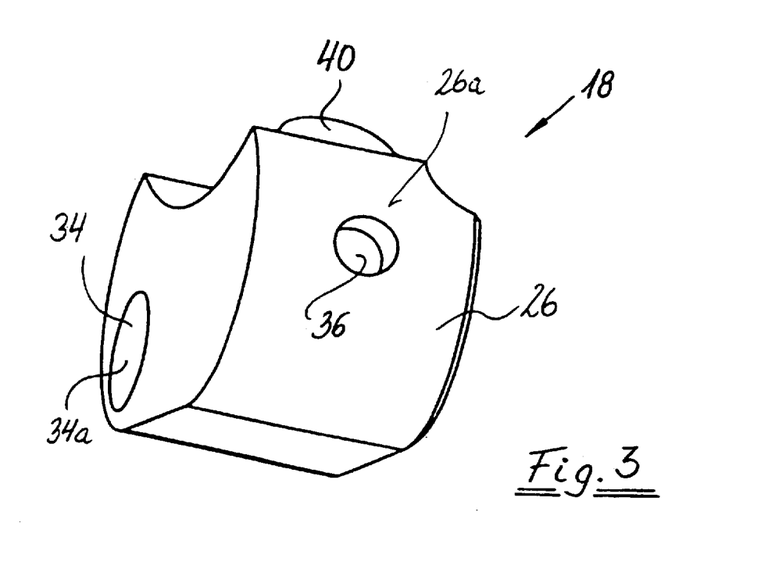
FIG. 3 illustrates a rear view, in perspective, of the deflecting element according to the invention from the direction of the arrow III in FIG. 1.

The two deflecting-element parts 26 and 28 may be connected, for example, during the fastening of the deflecting element 18 or of the deflecting-element parts 26 and 28 to the threaded nut 12. For this fastening, the main deflecting-element part 26 comprises a through-passage hole 34 through which a screw-bolt (not illustrated) can be guided and screwed to the threaded nut 12. For accommodating the head of the screw-bolt, the through-passage hole 34 is preferably designed with a widened recess 34a at one of its ends, as shown in FIG. 3.

On a section 26a of the outer surface of the main deflecting-element part 26 which is opposite the mouth opening 20b, a blind hole 36 is provided in the main deflecting-element part 26. A retaining or prestressing ball 37 (shown in phantom in FIG. 1) is inserted into said blind hole 36 during fitting of the deflecting element 18 on the threaded nut 12. In this case, the depth of the blind hole 36 and the diameter of the retaining or prestressing ball 37 are dimensionally coordinated with one another such that the ball 37 projects from the blind hole 36 to a somewhat greater extent than corresponds to the play or clearance between the deflecting element 18 and the recess 12b in the threaded nut 12 which is intended for accommodating the deflecting element (see FIG. 4). Some force thus has to be used to force the deflecting element 18 into its mounting recess 12b. If use is made here of a retaining or prestressing ball which is produced from a harder material than the deflecting element 18, for example hardened steel, the blind hole 36, and in particular the base thereof, is elastically or plastically deformed by the ball. If, in contrast, the ball 37 is produced from a softer material than the deflecting element 18, for example NBR (Nitrile-Butadiene Rubber), the ball 37 is elastically or plastically deformed. As a result of the interaction of the retaining or prestressing ball 37 with the recess 12b and the plastic material of the main deflecting-element part 26 which encloses the blind hole 36, the deflecting element 18 is prestressed in the mounting recess 12b such that the mouth opening 20b of the deflecting channel 20 in the vicinity of the threaded channel 16 is forced into engagement with the threaded channel 16 such that an essentially smooth transition between the threaded channel 16 and deflecting channel 20 is produced for the rolling bodies accommodated in the deflecting channel 24.

In order for it to be possible to allow and/or ensure problem-free transfer of the rolling bodies from the threaded channel 16 into the deflecting channel 20 and vice versa, the deflecting element 18 has a rolling-body lifting extension 40. The outer contour of the extension 40 is selected essentially in adaptation to the configuration of the thread turns of the threaded spindle, although it has been ensured here that, in the state in which the rolling-body screw drive 10 is assembled and ready for operation, the rolling-body lifting extension 40, and in particular the lifting nose 40c thereof, runs in an essentially equidistant manner to the base surface of the thread turns of the threaded spindle. As can be seen, in particular, in FIG. 1, the rolling-body lifting extension 40 is made up of a first extension part 40a, which is formed on the main deflecting-element part 26, and of a second extension part 40b, which is formed on the secondary deflecting-element part 28.

As is illustrated in FIG. 4, the return channel 22, rather than being formed directly on the threaded nut 12, is accommodated in a return tube 42 which is formed separately from the threaded nut and is accommodated with play in an axial through-passage 12c of the threaded nut 12. By way of its ends 42a and 42b, the return tube 42 engages in a recess 44 of each deflecting element 18, which recess encloses the mouth opening 20a of the deflecting channel 20 in the manner of an annular shoulder. As can also be gathered from FIG. 1, a first circumferential section 44a of the annular-shoulder-like recess 44 is formed on the main deflecting-element part 26, while a second circumferential section 44b is formed on the secondary deflecting-element part 28.

The recess 44 and the return tube 42 are coordinated with one another such that the return tube 42 is retained on the deflecting element 18 in an essentially play-free manner, preferably clamped, e.g., force-fitted, thereto. Furthermore, the deflecting channel 20 and the return tube 42 have the same internal diameter or the same inside width, with the result that the deflection channel 20 and the return channel 22 adjoin one another in an essentially flush and step-free manner. The provision of such a return tube 42 which does not come into contact with the boundary walls of the axial through-passage 12c has the advantage that it is readily possible not just during the assembly, but also during operation, of the rolling-body screw drive 10 for the radial position of the return channel 22 in relation to the axis A to be adapted to the precise positioning of the deflecting elements 18, and in particular the positioning of the mouth opening 20a of the deflecting channel 20, with the result that a smooth and essentially step-free transition between the deflecting channel 20 and return channel 22 is always ensured. A further advantage of using the return tube 42 resides in the associated reduction of noise.

A further special feature of the deflecting element 18 according to the invention is that a sub-surface 48 of its outer circumferential surface is designed as part of a thread flank of the penultimate thread turn 14a of the threaded surface 14. The sub-surface 48 of the deflecting element 18, in turn, is formed in part (at 48a) on the main deflecting-element part 26 and in part (at 48b) on the secondary deflecting-element part 28. As a result of the above described formation of the deflecting element 18 with the thread-flank sub-surface 48, the deflecting element 18 can extend, in the direction of the axis A, into the region of the penultimate thread turn 14a, i.e., it may be dimensioned to be considerably thicker in the direction of the axis A than was the case with conventional deflecting elements. This allows the deflecting element 18 to be of particularly robust and stable design. In order to prevent the deflecting element 18 from being subjected to increased wear on account of the engagement with the rolling bodies circulating in the threaded channel 16, at least that part of the thread flank of the thread turn 14a in which the thread-flank boundary sub-surface 48 of the deflecting element 18 is arranged is specifically relieved of loading by "shifting" of the thread turns, with the result that the rolling bodies can roll on the surface 48 without loading.

Figure 5:
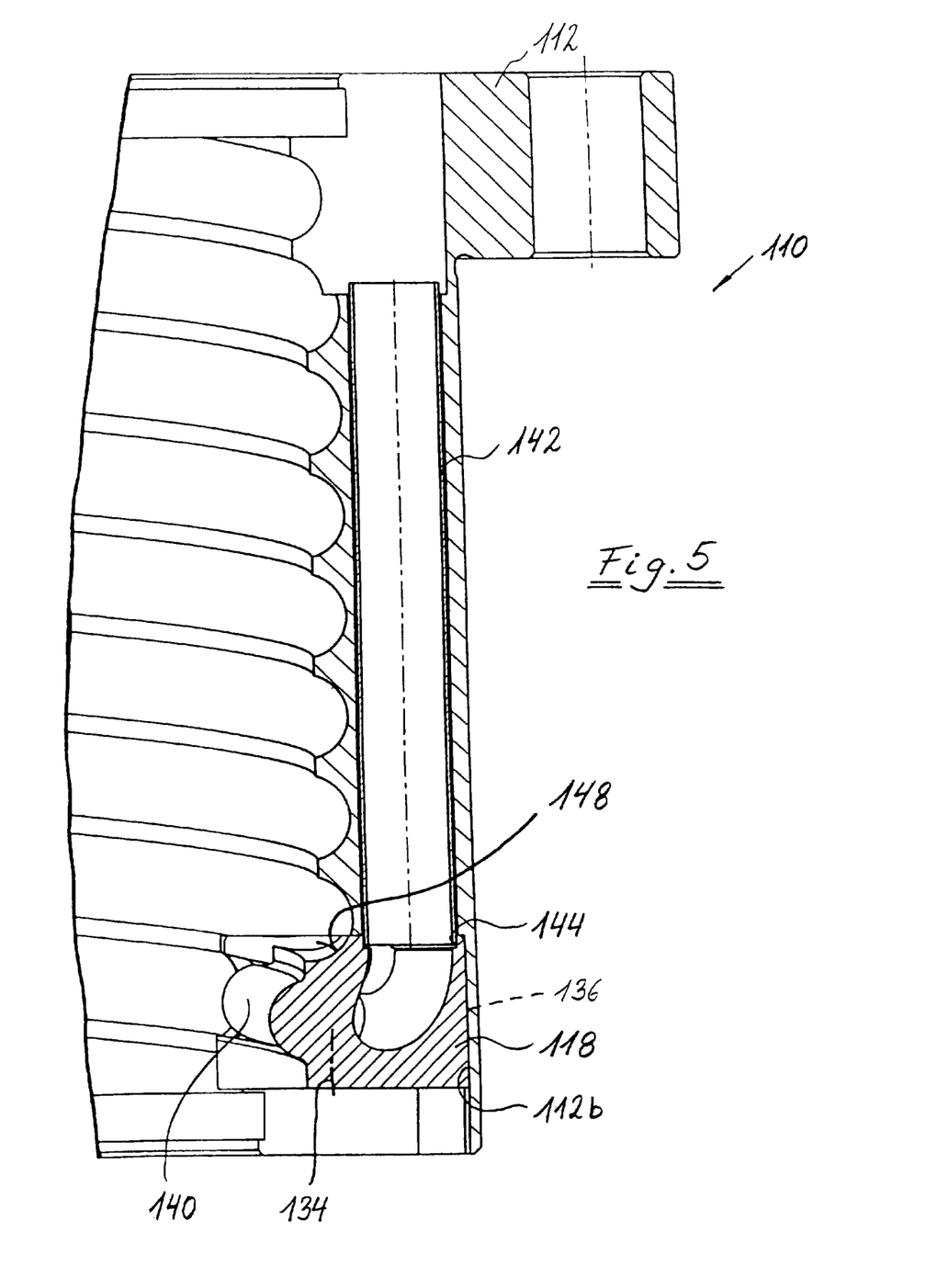
FIG. 5 illustrates a view similar to FIG. 4 of a threaded nut of a rolling-body screw drive according to the invention and in which single-part deflecting elements are used.

With reference to FIG. 5, the illustration of the threaded nut 112 of a rolling-body screw drive 110 is merely intended to explain that the following features, which have been explained above by way of the example of the two-part deflecting element 18, can be realized just as well in conjunction with a single-part deflecting element 118:

- the provision of a return tube 142 which engages in an annular-shoulder-like centering cutout 144 of the deflecting element 118;
- the provision of a rolling-body lifting extension 140;
- the provision of a thread-flank boundary sub-surface 148; and
- (although this cannot be gathered directly from FIG. 5) the biasing of the deflecting element 118, by means of a ball accommodated in a blind hole 135, in the mounting recess 112b of the threaded nut 112 and the screwing of the deflecting element 118 to the threaded nut 112 using a through-passage hole 134.

As far as the details of these features are concerned, reference is made to the above description of FIGS. 1 to 4 of the rolling-body screw drive 10 and of the deflecting element 18.

What is claimed is:

1. A rolling-body screw drive, comprising:

a threaded spindle having an axis (A) of elongation;

a threaded nut earned by the threaded spindle for movement axially therealong;

a helically running threaded channel provided between an outer circumferential surface of the threaded spindle and an inner circumferential surface of the threaded nut;

the threaded channel forming, together with an axially extending return channel in the nut which connects the two axial end regions of the threaded channel, an endless circulatory channel;

an endless series of rolling bodies accommodated in the circulatory channel;

a deflecting element mounted on the threaded nut adjacent each of the two end regions of the threaded channel, each of the deflecting elements having therein a deflecting channel for transferring the rolling bodies between at least one of (1) the threaded channel and the return channel and (2) the return channel and the threaded channel; and the penultimate thread turn of the threaded surface on the nut bounding the threaded channel is formed at least in part by the outer surface of the adjacent deflecting element.

2. The rolling-body screw drive as claimed in claim 1, wherein the penultimate thread turn has a running-path flank which leads into the adjacent deflecting element, the course of said running-path flank being selected such that said running-path flank is specifically relieved of loading as the rolling bodies move therealong.

3. The rolling-body screw drive as claimed in claim 1, wherein:

each of the deflecting channels includes an inlet end and an outlet end;

each of the deflecting elements comprises at least two deflecting-element parts which together bound the deflecting channel; and a boundary surface of each of the deflecting-element parts extends from the inlet end to the outlet end of each deflecting channel, said boundary surface serving to bound the respective deflecting channel.

4. A rolling-body screw drive, comprising:

a threaded spindle having an axis (A) of elongation;

a threaded nut carried by the threaded spindle for movement axially therealong;

a helically running threaded channel provided between an outer circumferential surface of the threaded spindle and an inner circumferential surface of the threaded nut;

the threaded channel forming, together with an axially extending return channel in the nut which connects the two axial end regions of the threaded channel, an endless circulatory channel;

an endless series of rolling bodies accommodated in the circulatory channel;

a deflecting element mounted on the threaded nut adjacent each of the two end regions of the threaded channel, each of the deflecting elements having therein a deflecting channel for transferring the rolling bodies between at least one of (1) the threaded channel and the return channel and (2) the return channel and the threaded channel;

the threaded nut is formed with a recess for accommodating each deflecting element; and each deflecting element has a recess into which there is inserted a retaining element which is formed from a harder or softer material than the deflecting element, the retaining element being dimensioned in the direction of the depth of the retaining-element recess such that the retaining element accommodated in the retaining-element recess projects therefrom to a greater extent than corresponds to the clearance provided between the deflecting element and the accommodating recess in the nut.

5. The rolling-body screw drive as claimed in claim 4, wherein the retaining element projects from the retaining-element recess by between approximately 0.05 mm and approximately 0.4 mm.

6. The rolling-body screw drive as claimed in claim 4, wherein the retaining element is a ball.

7. The rolling-body screw drive as claimed in claim 4, wherein the retaining-element recess is provided in a sub-surface of the outer surface of the deflecting element, said sub-surface being arranged essentially opposite that sub-surface of the outer surface of the deflecting element into which the end section of the deflecting channel leading to the threaded channel opens.

8. A rolling-body screw drive, comprising:

a threaded spindle having an axis (A) of elongation;

a threaded nut carried by the threaded spindle for movement axially therealong;

a helically running threaded channel provided between an outer circumferential surface of the threaded spindle and an inner circumferential surface of the threaded nut;

the threaded channel forming, together with an axially extending return channel in the nut which connects the two axial end regions of the threaded channel, an endless circulatory channel;

an endless series of rolling bodies accommodated in the circulatory channel;

a deflecting element accommodated and mounted in a recess formed in the threaded nut adjacent each of the two end regions of the threaded channel, each of the deflecting elements having therein a deflecting channel for transferring the rolling bodies between at least one of (1) the threaded channel and the return channel and (2) the return channel and the threaded channel, with at least one of the deflecting elements comprising at least two deflecting-element parts which together bound the deflecting channel; and the penultimate thread turn of the threaded surface on the nut bounding the threaded channel is formed at least in part by the outer surface of the adjacent deflecting element.

9. The rolling-body screw drive as claimed in claim 8, wherein the penultimate thread turn has a running-path flank which leads into the adjacent deflecting element, the course of said running-path flank being selected such that said running-path flank is specifically relieved of loading as the rolling bodies move therealong.

10. A rolling-body screw drive, comprising:
    a threaded spindle having an axis (A) of elongation;
    a threaded nut carried by the threaded spindle for movement axially therealong;
    a helically running threaded channel provided between an outer circumferential surface of the threaded spindle and an inner circumferential surface of the threaded nut;
    the threaded channel forming, together with an axially extending return channel in the nut which connects the two axial end regions of the threaded channel, an endless circulatory channel;
    an endless series of rolling bodies accommodated in the circulatory channel;
    a deflecting element accommodated and mounted in a recess formed in the threaded nut adjacent each of the two end regions of the threaded channel, each of the deflecting elements having therein a deflecting channel for transferring the rolling bodies between at least one of (1) the threaded channel and the return channel and (2) the return channel and the threaded channel, with at least one of the deflecting elements comprising at least two deflecting-element parts which together bound the deflecting channel; and
    each deflecting element has a recess into which there is inserted a retaining element which is formed from a harder or softer material than the deflecting element, the retaining element being dimensioned in the direction of the depth of the retaining-element recess such that the retaining element accommodated in the retaining-element recess projects therefrom to a greater extent than corresponds to the clearance provided between the deflecting element and the accommodating recess in the nut.

11. The rolling-body screw drive as claimed in claim 10, wherein the retaining element projects from the retaining-element recess by between approximately 0.05 mm and approximately 0.4 mm.

12. The rolling-body screw drive as claimed in claim 10, wherein the retaining element is a ball.

13. The rolling-body screw drive as claimed in claim 10, wherein the retaining-element recess is provided in a sub-surface of the outer surface of the deflecting element, said sub-surface being arranged essentially opposite that sub-surface of the outer surface of the deflecting element into which the end section of the deflecting channel leading to the threaded channel opens.

14. A rolling-body screw drive, comprising:
    a threaded spindle having an axis (A) of elongation;
    a threaded nut carried by the threaded spindle for movement axially therealong;
    a helically running threaded channel provided between an outer circumferential surface of the threaded spindle and an inner circumferential surface of the threaded nut;
    the threaded channel forming, together with an axially extending return channel in the nut which connects the two axial end regions of the threaded channel, an endless circulatory channel;
    an endless series of rolling bodies accommodated in the circulatory channel;
    a deflecting element accommodated and mounted in a recess formed in the threaded nut adjacent each of the two end regions of the threaded channel, each of the deflecting elements having therein a deflecting channel for transferring the rolling bodies between at least one of (1) the threaded channel and the return channel and (2) the return channel and the threaded channel, with at least one of the deflecting elements comprising at least two deflecting-element parts which together bound the deflecting channel; and
    each deflecting element has a rolling-body lifting extension for engagement in a thread turn of the threaded spindle.

15. The rolling-body screw drive as claimed in claim 14, wherein the outer contour of the rolling-body lifting extension is designed to correspond substantially to the contour of a base surface of the thread turn.

16. The rolling-body screw drive as claimed in claim 15, wherein, in the state in which the rolling-body screw drive is assembled and ready for operation, said outer contour is arranged in a substantially equidistant manner to the contour of the base surface of the thread turn of the threaded spindle.

17. A rolling-body screw drive, comprising:
    a threaded spindle having an axis (A) of elongation;
    a threaded nut carried by the threaded spindle for movement axially therealong;
    a helically running threaded channel provided between an outer circumferential surface of the threaded spindle and an inner circumferential surface of the threaded nut;
    the threaded channel forming, together with an axially extending return channel in the nut which connects the two axial end regions of the threaded channel, an endless circulatory channel;
    an endless series of rolling bodies accommodated in the circulatory channel;
    a deflecting element accommodated and mounted in a recess formed in the threaded nut adjacent each of the two end regions of the threaded channel, each of the deflecting elements having therein a deflecting channel for transferring the rolling bodies between at least one of (1) the threaded channel and the return channel and (2) the return channel and the threaded channel;
    at least one of the deflecting elements comprises at least two deflecting-element parts which together bound the deflecting channel; and
    the return channel is formed by the interior of a return tube which is designed in one or more parts and is inserted into a return cutout of the threaded unit.

18. The rolling-body screw drive as claimed in claim 17, wherein at least one of the longitudinal ends of the return tube engages in an annular recess formed in the adjacent deflecting element.

19. The rolling-body screw drive as claimed in claim 17, wherein the return tube is clamped to the adjacent deflecting element.

* * * * *

UNITED STATES PATENT AND TRADEMARK OFFICE
CERTIFICATE OF CORRECTION

PATENT NO. : 6,561,053 B2  Page 1 of 1
DATED : May 13, 2003
INVENTOR(S) : Greubel, Roland It is certified that error appears in the above-identified patent and that said Letters Patent is hereby corrected as shown below:

<u>Title page,</u>
Item [73], Assignee, "Rexroth Satr GmbH," should read -- Rexroth Star GmbH, --

Signed and Sealed this

Twenty-third Day of September, 2003

JAMES E. ROGAN
*Director of the United States Patent and Trademark Office*